L. SONIAT.
Improvement in Stalk-Cutters.
No. 131,574.  Patented Sep. 24, 1872.
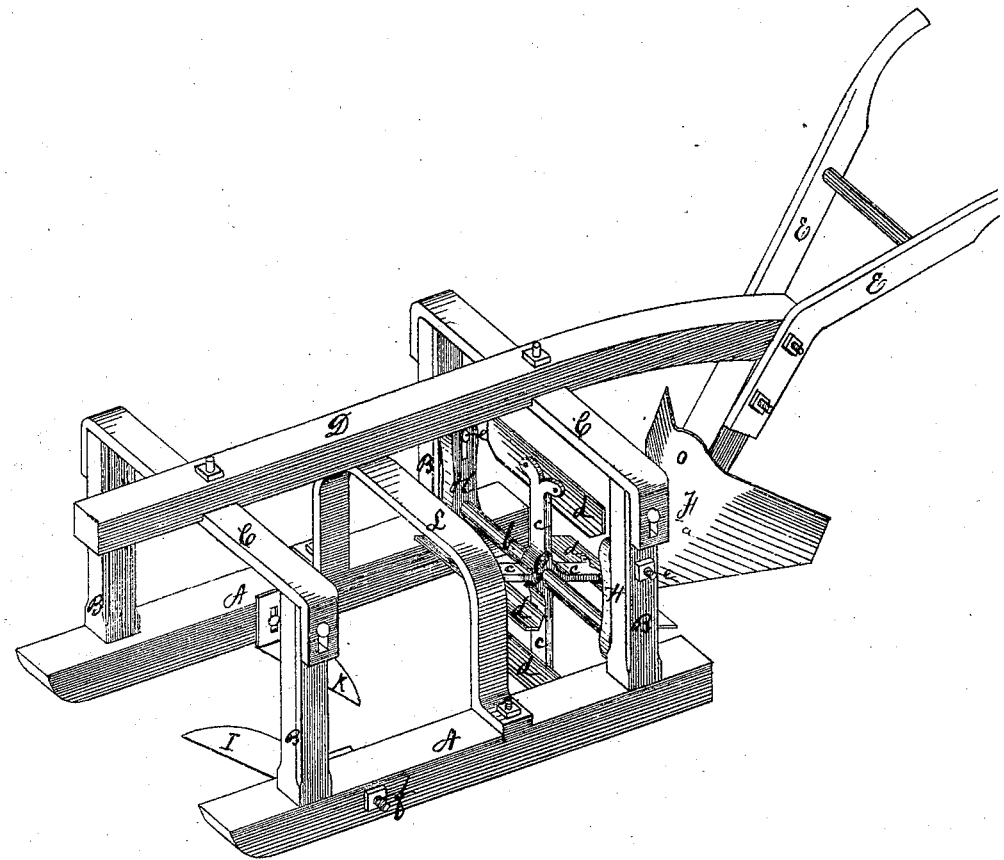
Witnesses
H. N. Jenkins
S. J. Olmstead
Inventor
Lucien Soniat

UNITED STATES PATENT OFFICE.

LUCIEN SONIAT, OF PARISH OF JEFFERSON, LOUISIANA.

IMPROVEMENT IN STALK-CUTTERS.

Specification forming part of Letters Patent No. 131,574, dated September 24, 1872.

*To all whom it may concern:*

Be it known that I, LUCIEN SONIAT, of the parish of Jefferson and State of Louisiana, have invented a new, useful, and Improved Combined Cane-Scraper and Stubble-Cutter; and I hereby declare the following to be a full, clear, and exact description thereof, reference being had to the accompanying drawing making a part of this specification.

My improvement relates to a simple but highly-efficient agricultural implement, which is designed to be especially useful and applicable to the purposes of removing the superabundant earth from the planted cane-stalks of a sugar-plantation which have been covered deeply in the ground during the cold or frosty season, and from which a portion of the said superabundant earth has to be removed when the proper season for their germination and propagation arrives. By the addition of a simple device to the implement as complete, and as adapted to the purposes above mentioned, it is furthermore rendered useful for what in the sugar-producing countries is technically known as a "stubble-shaver" or "stubble-cutter."

It is probably well known to persons familiar with the cultivation of sugar-cane that after the cane has been cut, either for planting or for the purpose of pressing the juice therefrom, the stumps or stubble remaining are at the proper season cut or closely shaved off from the stalks from which they were the preceding season propagated. The cutting or shaving of this stubble, together with its removal when so cut, as well as that of the removal of the surplus earth from the originally-planted cane-stalks, as before stated, is a process which involves annually an outlay of much labor and expense.

My improvement, as repeatedly demonstrated by actual experiment upon several sugar-plantations in the parish where I reside, will, with one man and two mules, perform the equivalent of that produced by fifteen skilled laborers. My invention becomes, therefore, not only of importance to sugar-planters, but to the public in general.

My improvement will now be better understood by reference to the annexed drawing, whereon all that I claim as pertaining thereto is clearly illustrated, and whereon it is shown in perspective as complete and ready for use.

A shows two ground-runners, which may be constructed of wood and provided with iron ground-straps to prevent a too rapid wearing away by reason of contact with the earth over which the implement is made to pass. The said runners A support the vertical standards B, to which are attached the cross-frames C, and which in turn support the longitudinal beam D. To the rear end of this beam are secured the handles E, and to the forward end thereof are attached the draft animals. The cross-frames C, aforesaid, are made of iron, and have their ends bent downwardly and slotted thereat to the end of making them vertically adjustable upon the said vertical standards B, to which for this purpose they are secured by means of the set-screws $a$. By the vertical adjustability of the said cross-frames B, either end of the beam D attached thereto, as before stated, may be raised or lowered, as desired, so as to regulate the depth of cutting required by the plow-point or scraper F, likewise secured to the upright portion of the said beam D. G shows a revolving device, consisting of the axle $b$, arms $c$, and blades $d$, which is provided with bearings in the lower extremities of the straps H. These straps are provided with slots, as shown, and made adjustable upon the upright standards B, to which they are secured by means of the bolts or set-screws $e$. In this manner it will be perceived that the revolving device G may be raised or lowered as desired, so that the blades $d$ thereof may penetrate through any depth of earth to and upon the planted cane-stalks, and upon which the said blades are expected to travel, to the end of regulating the depth of cutting or quantity of earth which it is necessary to remove therefrom by means of the plow-point or scraper F, which follows the said revolving device. The relative vertical positions of the outer extremities of the wheel or device G and that of the lower extremity of the scraper F being thus held under perfect control, it will be readily understood that any desired amount of earth may be removed from the planted cane-stalks, and any desired depth of earth may be allowed to remain thereupon. I and K are the stubble-cutters or shears, which are placed at an angle with the runners A, to which they are secured by means of set-screws *f*. These set-screws pass through slots in the ends of the said shears I and K, so as to be vertically adjustable with relation to each other and with relation to the runner A, to which they are secured, as before stated, to the end of regulating thereby the depth to which the stubble is cut off by them, a purpose for which they are to be used when required. The slots by which they may be raised or lowered, as above mentioned, are not shown upon the drawing. L is a cross-brace to assist in holding the runners A in their proper positions.

Having described my invention, what I desire to secure by Letters Patent is the following:

*Claims.*

1. The arrangement of the runners A, standards B, adjustable cross-frames C, beam D, and plow-point or scraper F, for the purposes specified.

2. In combination with the adjustable frame, the beam D, plow-point F, and adjustable wheel G, when the whole are constructed and arranged so as to operate substantially as described.

3. The beam D, plow-point F, wheel G, and adjustable shears I K, the whole being so constructed, combined, and arranged in connection with a suitable frame as to operate substantially as described.

LUCIEN SONIAT.

Witnesses:
H. N. JENKINS,
L. J. OLMSTEAD.